(No Model.) 2 Sheets—Sheet 1.
L. H. NASH.
PROPORTIONAL WATER METER.
No. 353,702. Patented Dec. 7, 1886.
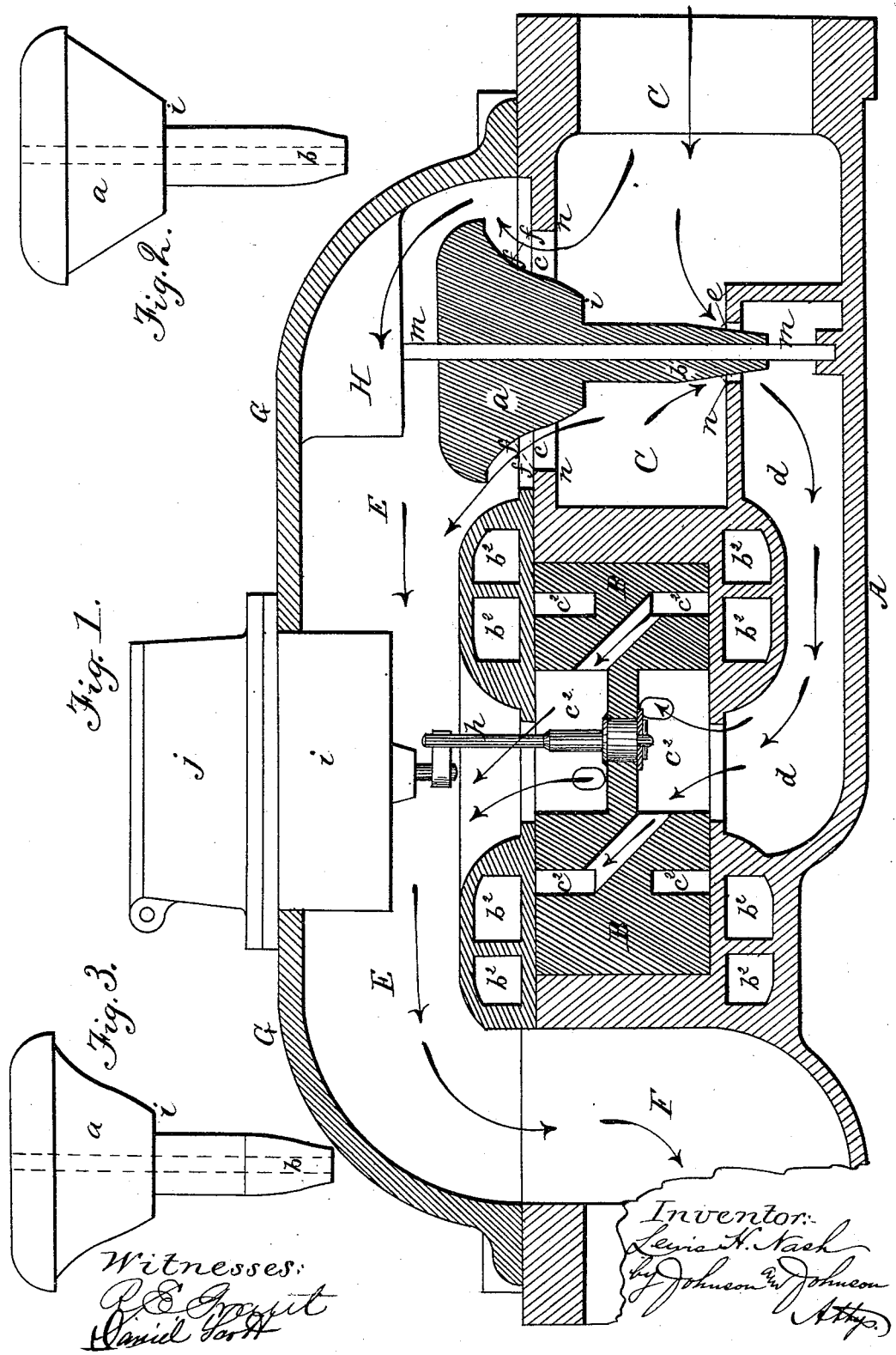
Witnesses:
Inventor:
Lewis H. Nash
by Johnson & Johnson
Atty.

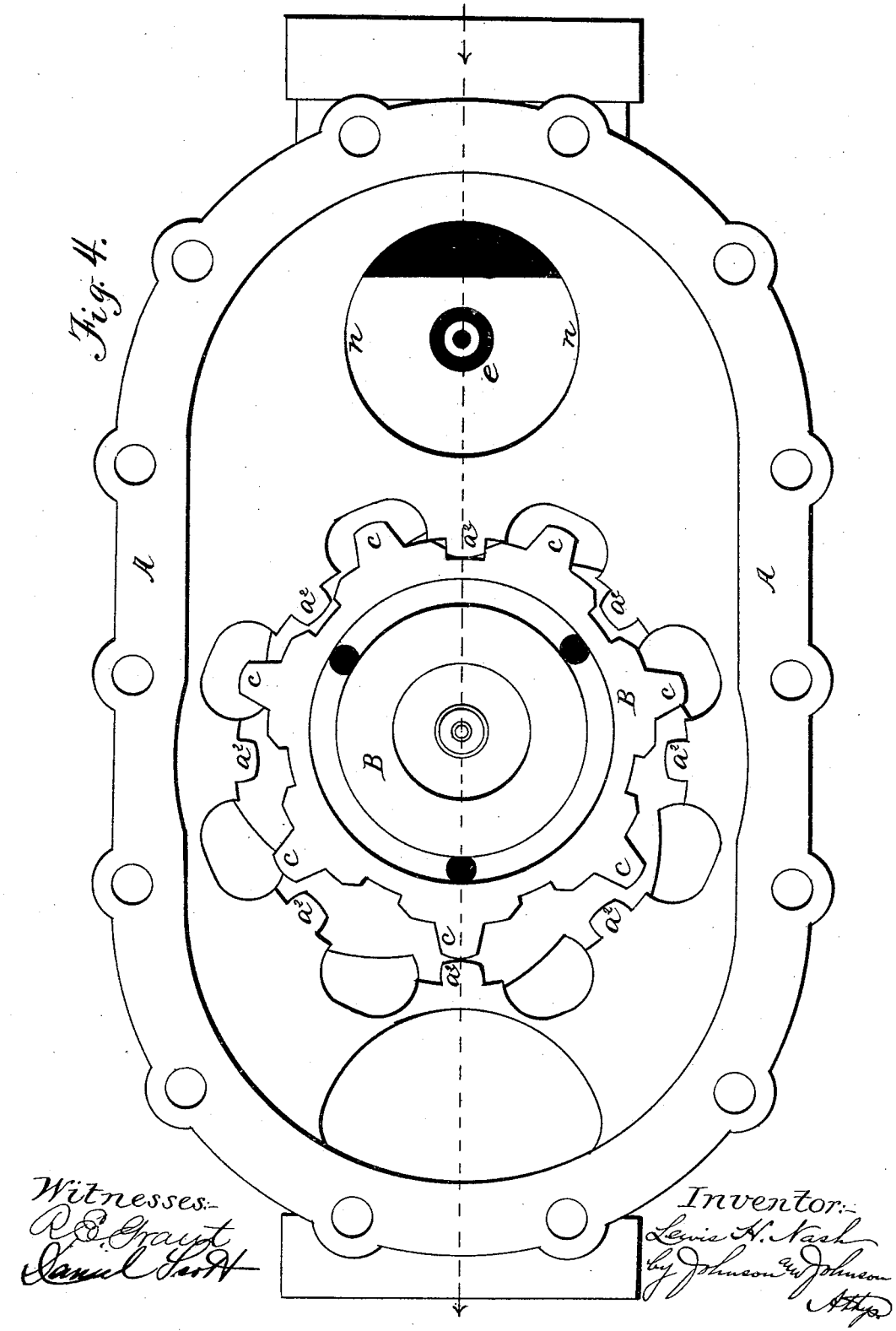

UNITED STATES PATENT OFFICE.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 353,702, dated December 7, 1886.

Application filed January 16, 1886. Serial No. 188,774. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

As an improvement in meters for measuring a volume of flowing water in divided streams for effecting the measurement of one stream to determine the measurement of both streams, I have devised an automatic flow-controlling valve of two coacting conoidal parts, in which the conoids are of such form that the relative proportions of the discharge-orifices for the two streams will be rendered different for every position of the valve and for every rate of flow, the said proportional areas of the orifices being determined by actual test for every rate of flow. This variation of the proportional areas of the discharge-orifices for every rate of flow, in connection with the manner of determining such result, is fully set forth in applications for patents filed by me September 4, 1885, under Serial Nos. 176,159 and 176,160, and in pursuance whereof Letters Patent Nos. 336,138 and 336,139 were issued under date of February 16, 1886, and November 30, 1885, under Serial Nos. 184,329 and 184,330, and in pursuance whereof Letters Patent Nos. 336,145 and 336,146 were issued under the same date, and such matter is not broadly claimed herein, as my improvement is limited to a double vertically-operating conoidal valve having each a surface formation adapted to vary the proportional discharge-orifices of the two streams, so as to pass a definite proportion of the flowing volume for every rate of flow, as I will now proceed to describe.

Referring to the accompanying drawings, a complete meter is shown in Figure 1, having my improved flow-controlling valve; Figs. 2 and 3, the double conoidal valve formed with the curved outlines for the purpose stated; and Fig. 4 is a top view, the meter-case cover and valve being removed to expose the piston and valve-ports.

I use a measuring device of suitable construction, through which the measured stream flows, and in the present case I employ the meter known in the trade as the "crown" meter, for which Letters Patent were granted to me January 21 and 28, 1879, a full and particular description whereof is deemed unnecessary, and to which reference is made, as illustrating one form of meter to which my improved valve is applied.

As shown, the meter-case A is formed with interior alternate wall-projections, $a^2$, and recesses and head-ports $b^2$, and the piston B is shown as forming a valve and having similar alterate projections $c$ and recesses. By the co-operation of these projections the case-chamber is divided into receiving and discharging spaces by the operation of a valve-forming piston, which has an epicycloidal movement about the center of the case, and thus controls the inlet and discharge of the water. The piston connects by a crank-spindle, $h$, with gearing contained in the box $i$, which gearing operates the indicating mechanism contained in the box $j$ in a well-known manner. In this construction the piston-ports $c^2$ are made concentric, and co-operate with the case-head ports $b^2$ to effect the division stated; but my improved flow-controlling valve is not confined to these piston-operating parts.

Referring to Fig. 1, the inflow volume is divided into two streams by the double valve fitted to operate vertically in the inflow-passage C to operate two ports, the upper one of which communicates with the outlet-passage F by a chamber, E, formed over the meter-operating device by a cover, G, upon which the box $j$, containing the meter-operating parts, is seated, but which operating parts are not affected by the stream flowing through this chamber. The lower port communicates with the said outlet-chamber by the bottom passage, $d$, and the piston, which is operated by the stream passing through it, and is the measured stream. The valve is weighted, and is formed of two conoidal parts adapted to control discharge-orifices of unequal area, one or both parts being formed of curved outlines.

The largest top valve part, $a$, is shown in Fig. 1 as having a curved outline, and controls the port $c$ of the main passage; and the bottom valve part, $b$, is much smaller, controls the port $e$ of the metered passage, and has a true conical outline. In Fig. 2 these conoidal valve-outline formations are reversed, and in Fig. 3 is shown a valve having both its valve parts formed with curved outlines. The upper valve part, $a$, terminates in a lower flat part, $i$, against which the pressure in the inlet-passage acts to lift it. The inlet-passage C extends around the valve between its port-seats $n$, which are in the case-wall, and upon which the valves close in its lowest position.

The diameters of the valve parts are proportioned to the quantity of water which must pass in each stream; and the capacity of the discharge-ports and the weight of the valve are such that for any given rate of delivery of the meter the coacting valves will be held in a definite position, and will open the ports for each stream the proper area to pass the required proportion of the flowing volume. The coacting valves are fitted upon a fixed central guide-pin, $m$, and its ascent is controlled by a stop, H, on the inner wall of the meter-cover, so that both valve parts will maintain the proper central relation to their respective seats and port-edges.

The curved outline of the valves is of an ogee or cyma-reversa form, and its weight is determined by the pressure of the water, so as to offer considerable resistance to its flow. The irregular or curved outline may be upon one or upon both parts of the valve, and the operation to determine the exact outline required is as follows, viz: Supposing the valve parts to be formed of true cones, for the purpose of preliminary test, it will be found that the meter will register a less proportional quantity of water upon the large rates of flow, and much less water upon the very small rates of flow than it will on the medium rates of flow. Now, the quantity of water that will pass through the discharge-ports cannot be determined by the size of these ports alone, but also by the construction of the indicating apparatus, and by the hydraulic friction in all the communicating passages. Now, the influence of these latter resistances cannot be determined except by actual test. Suppose, therefore, that the meter be delivering a quantity of water such as to lift the valve to the position shown in Fig. 1, and that under these conditions the meter registers a greater proportion of the flowing stream than desired. Then, in order to cause a larger proportion to flow in the main channel, I curve out a portion of the outline of the cone $a$, so as to enlarge the discharge-ports $f$ $f$; or, what will produce the same effect, I contract the port-opening until the proportional delivery for that rate of flow is just what is required with the curved outline of the valve. Then, for a different rate of flow, the coacting valves will occupy a new position, and the curved walls will be formed at the orifice of the shape to pass the same proportion of water for each stream, as in the former case, and in this way the valves will be formed and shaped for every rate of flow, so that the registration of the meter will be accurate for every rate of flow. It is this action of the coacting valves, in always assuming the same position when the same quantity of water is passing, which permits them to exert the regulating effect upon the two streams for every rate of flow, and which makes the registration of the device reliable.

In Fig. 1 the course of the divided streams is shown by the arrows.

A weighted valve having two conoidal parts, which reciprocate longitudinally together for controlling the discharge-orifices of a water-meter having its influent volume divided into two streams, whereby the valves are caused to operate to open the discharge-orifices with a constant or fixed ratio to each other by true cones having unequal tapers, is not new, and I do not claim such coacting valves.

I claim—

1. The combination, with a water-meter having the influent volume divided into two streams, one of which is measured, of coacting valves of conoidal form, having curved or irregular surface formation whereby to vary the proportional discharge-orifices for the two streams, and thereby cause a definite proportion of the flowing volume to pass for every rate of flow, substantially as described, for the purpose specified.

2. The combination, with a water-meter having the inflow divided into two streams, one of which is measured, of a valve having two conoidal parts passing through each valve-port, and having one or both parts formed with curved or irregular surfaces, substantially as described, for the purpose specified.

3. The combination, with a water-meter case having two passages for the divided streams of the influent volume, of a valve having two conoidal parts, one of which is formed with curved or irregular surfaces, substantially as described, for the purpose specified.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.